United States Patent [19]

Krause et al.

[11] Patent Number: 5,976,652
[45] Date of Patent: Nov. 2, 1999

[54] POLYPROPYLENE FILM/ADHESION PROMOTER/METAL LAMINATE AND ITS USE FOR THE PRODUCTION OF PACKAGING CONTAINERS

[75] Inventors: Siegfried Krause; Leonidas Kiriazis, both of Münster, Germany

[73] Assignee: PPG Industries, Inc., Pittsburgh, Pa.

[21] Appl. No.: 08/924,406

[22] Filed: Aug. 22, 1997

Related U.S. Application Data

[63] Continuation of application No. 08/392,864, Mar. 28, 1995, abandoned, which is a continuation of application No. PCT/EP93/02298, Aug. 26, 1993.

[30] Foreign Application Priority Data

Sep. 3, 1992 [DE] Germany .............................. 42 29 419

[51] Int. Cl.⁶ ............................................... B32B 15/08
[52] U.S. Cl. ..................... 428/35.9; 156/332; 156/244.1; 264/173.12; 428/463; 428/515; 428/520
[58] Field of Search .................................. 428/35.9, 457, 428/461, 515, 516, 520, 463, 522; 526/124; 525/207; 156/325, 326, 332, 244.11; 264/173.1

[56] References Cited

U.S. PATENT DOCUMENTS

| | | | |
|---|---|---|---|
| 4,251,407 | 2/1981 | Schroeder et al. | 260/23 R |
| 4,366,185 | 12/1982 | Tanaka et al. | 427/386 |
| 4,584,348 | 4/1986 | Nagano | 525/207 |
| 4,606,953 | 8/1986 | Suzuki et al. | 428/36 |
| 4,615,918 | 10/1986 | Reichert et al. | 427/385.5 |
| 4,681,816 | 7/1987 | Hashimoto et al. | 428/463 |
| 4,710,404 | 12/1987 | Reichert et al. | 427/386 |
| 4,740,393 | 4/1988 | Cody et al. | 427/388.1 |
| 4,980,210 | 12/1990 | Heyes et al. | 428/35.9 |
| 5,066,738 | 11/1991 | Ewen | 526/124 |
| 5,079,052 | 1/1992 | Heyes et al. | 428/35.3 |
| 5,091,260 | 2/1992 | Wong | 428/461 |
| 5,132,344 | 7/1992 | Matteodo | 524/101 |
| 5,516,397 | 5/1996 | Takano et al. | 156/244.23 |

FOREIGN PATENT DOCUMENTS

| | | |
|---|---|---|
| 0 065 417 B1 | 1/1986 | European Pat. Off. . |
| 0 482 577 A2 | 4/1992 | European Pat. Off. . |
| 0 551 921 A1 | 7/1993 | European Pat. Off. . |
| 0 333 835 B1 | 1/1995 | European Pat. Off. . |
| 2 430 308 | 9/1978 | France . |
| 56-131671 | 10/1981 | Japan . |
| 60-204312 | 10/1985 | Japan . |
| 2 101 109 | 1/1983 | United Kingdom . |
| WO 89/03308 | 4/1989 | WIPO . |
| WO 93/24319 | 12/1993 | WIPO . |
| WO 93/24324 | 12/1993 | WIPO . |

OTHER PUBLICATIONS

Prof. Dr. Ir. A.K. van der Vegt, "Chain Length Distribution in a Polymer Formaton Process", *Polymeren*, 1992, pp. 32–33.

Society for Plastics Technology, "Foils for Thermally Molded Packaging: Raw Materials, Extrusion, Thermal Molding, Recycling", Publisher: Verein Deutscher Ingenieure, 1992, pp. 177–194.

BP Performance Polymers Inc. Product Bulletin for POLYBOND® Thermoplastic Adhesive Resin, 1989, 3 pages.

J. Boxall, *Developments in Pigments for Anti–Corrosion Coatings, Polym. Paint Color J.*, vol. 179, No. 4243, pp. 127–129 (1989).

European Patent Application, "Polypropylene Resin Compositions", Keigo et al., Mitsui Toatsu Chemicals, Inc. Jun. 1990.

*Primary Examiner*—Paul Thibodeau
*Assistant Examiner*—D. Lawrence Tarazano
*Attorney, Agent, or Firm*—Paul S. Chirgott

[57] ABSTRACT

The present invention relates to polypropylene film-adhesion promoter-metal laminates, adhesion promoter used being polypropylene modified with carboxyl groups and/or anhydride groups. Polypropylene random copolymers of 90 to 99% by weight, preferably 93 to 99% by weight, of propylene and 1 to 10% by weight, preferably 1 to 7% by weight, of comonomers, having a molecular weight distribution $M_w:M_n$ in the range from 2 to 10, preferably 3 to 6, and a melt flow index MFI 230° C./2.16 kg in the range of 1 to 20 g/10 min, preferably in the range from 4 to 15 g/10 min, are used for the production of the polypropylene film.

14 Claims, No Drawings

POLYPROPYLENE FILM/ADHESION PROMOTER/METAL LAMINATE AND ITS USE FOR THE PRODUCTION OF PACKAGING CONTAINERS

This is a continuation of U.S. patent application Ser. No. 08/392,864, filed Mar. 28, 1995, now abandoned, which is a continuation of PCT/EP93/02298; filed Aug. 26, 1993.

The present invention relates to polypropylene film-adhesion promoter used being polypropylene modified with carboxyl groups and/or anhydride groups, and the use of the plastic film-metal laminates for the production of packaging containers.

The coating acts as a protective layer in two ways. First, the coating protects the container or package by preventing the contents of the package from corroding the metal layer. Secondly, the coating protects the contents of the container by preventing the contents from being affected by the products of metal corrosion. Of course, the coating itself must not substantially affect or contaminate the contents (e.g., through components leaching out of the coating) during sterilization (carried out after filling) or during storage. This is particularly critical when the package contains food.

Furthermore, the coatings must be constructed in such a way that they withstand the mechanical stresses occurring during the further processing of the coated sheets to cans or closures, for example during deformation, punching, crimping, beading, etc. of the sheets.

Moreover, owing to high solvent emissions during drying of the coat, precautions must be taken to keep these emissions and the associated environmental pollution as low as possible.

The film coating of metal sheets has proven an advantageous process for the coating of sheets which are used in particular for the production of food packaging. Thus, for example, DE-A 3,128,641 describes a process for the production of laminates for food packaging, in which the metal sheet and a thermoplastic resin film, together with an adhesive arranged between these layers and based on a polyolefin containing carboxyl groups, are heated to temperatures above the melting point of the adhesive and then cooled together with the use of pressure, with the result that the metal/plastic laminate is produced.

Furthermore, DE-A 2,912,023, GB-A-2027391 and EP-B31701 also disclose laminates and food packaging containers produced from these laminates, in particular bags.

Laminates of metal foils with polyolefin or polypropylene films, where an adhesion promoter layer is arranged between the metal foil and the polyolefin film for better adhesion, are widely known. For example, polypropylenes which have been modified to render them polar, for example grafted with carboxylic acids or carboxylic anhydrides, are used as adhesion promoters. Such laminates are described, for example, in EP-A-101 250 and EP-A-312 306. In the case of polypropylene top layers and polypropylene adhesion promoters, however, the fact that the plastics films adhesively bonded to the metal have a tendency to exhibit crazing presents a problem. Otherwise, polypropylene plastics films have greater resistance to chemicals than polyethylene plastics films.

It was thus the object of the present invention in particular to develop polypropylene top layer/adhesion promoter/metal laminates which do not exhibit any crazing. Moreover, the adhesion of plastics top layer to the metal foil should of course be excellent.

The thermoplastic polypropylene film should protect the metal layer from corrosion by the contents of a package formed from the laminate. The film should likewise prevent the contents from being affected by the products generated from such corrosion. Furthermore, the plastic film itself should not affect or contaminate the contents (e.g., through components leaching out of the coating) during sterilization (carried out after filling) or during storage.

This object is achieved, surprisingly, by polypropylene film/adhesion promoter/metal laminates, wherein the polypropylene film comprises polypropylene random copolymers. The polypropylene random copolymers of the invention are 90 to 99%, preferably 93 to 99%, by weight propylene and 1 to 10%, preferably 1 to 7%, by weight comonomers. The polypropylene random copolymers have a molecular weight distribution $M_W$:$M_n$ in the range from 2 to 10, preferably from 3 to 6, and a melt flow index MFI 230° C./2.16 kg in the range from 1 to 20 g/10 min, preferably in the range from 4 to 15 g/min.

The invention also relates to the use of the coated metal sheets for the production of packaging containers.

The advantages of the polypropylene top layer/adhesion promoter/metal laminates according to the invention are essentially that the laminates show no tendency toward crazing.

Metal sheets having a thickness of from 0.04 to 1 mm and comprising black plate, tin plate, aluminum and various iron alloys which may be provided with a passivation layer based on nickel compounds, chromium compounds and zinc compounds are suitable for the production of the coated metal sheets according to the invention.

The metal sheets are coated with a thermoplastic laminate film which consists of an adhesion promoter layer and a polypropylene film, although it is possible also to apply one or more further thermoplastic layers to the polypropylene film. However, a laminate which consists of the polypropylene film, the adhesion promoter layer and the metal sheet is preferred.

The thermoplastic polypropylenes used as the top layer of the laminates are polypropylene random copolymers, in each case in the form of a sheet or of a film. These may also be composite sheets and films (laminated sheet and laminated films) which are obtained, for example, by extruding different polypropylene random copolymers together. Such polypropylene films are produced by known processes (blowing process, chill roll process, etc.) from granules of the polypropylenes.

According to the invention, random polypropylene copolymers which are obtained by random copolymerization of 90 to 99% by weight, preferably 93 to 99% by weight, of propylene and 1 to 10% by weight, preferably 1 to 7% by weight, based in each case on the total weight of the monomers, of comonomers are suitable for the production of the polypropylene films of the polypropylene film/adhesion promoter/metal laminates. The random copolymers have a molecular weight distribution $M_W$:$M_n$ in the range from 2 to 10, preferably from 3 to 6, and a melt flow index MFI 230° C./2.16 kg in the range from 1 to 20 g/10 min, preferably in the range from 4 to 15 g/10 min (measured according to DIN 53,735). Such polypropylenes and processes for their preparation are known. They can be prepared, for example, by the polymerization process described in DE-A-37 30 022, using a Ziegler-Natta catalyst system. The propylene copolymers can be prepared, for example, in a gas-phase polymerization process at temperatures of 20 to 160° C. and at a pressure of 1 to 100 bar. The molecular weights of the polymers can be regulated by generally known measures, for example by means of regulators, such as, for example, hydrogen.

Suitable comonomers are, for example, $C_2$- and $C_4$- to $C_{12}$-α-monoolefins, in particular $C_2$- and $C_4$- to $C_6$-α-monoolefins, such as ethene, but-1-ene, 4-methylpent-1-ene, hex-1-ene, n-oct-1-ene, n-dec-1-ene and n-dodec-1-ene.

Polypropylene random copolymers of 1 to 4% by weight of ethylene and 99 to 96% by weight of propylene, based in each case on the total weight of the monomer composition, may be mentioned as being particularly suitable, the random copolymers having a molecular weight distribution $M_w:M_n$ in the range from 3 to 6 and a melt flow index MFI 230° C./2.16 kg in the range from 5 to 9 g/10 min (measured according to DIN 53,735). These polypropylene copolymers have a melting range from about 135 to about 155° C. (determined by DSC). When plastics films based on such polypropylenes are used, plastics film-metal laminates which exhibit no crazing at all are obtained.

Furthermore, polypropylene random copolymers of 90 to 97% by weight of propylene, 2 to 5% by weight of ethylene and 1 to 6% by weight of but-1-ene, based in each case on the total weight of the monomers, which have a molecular weight distribution $M_w:M_n$ in the range from 3 to 6 and a melt flow index MFI 230° C./2.16 kg in the range from 4 to 8 g/10 min, are particularly preferred. Such polypropylene random copolymers have a melting range from 120° C. to 140° C. (determined by DSC). The plastics films which are obtainable from these polypropylenes lead to plastics film-metal laminates which likewise exhibit no crazing at all.

All values stated for the melt flow index MFI are based on the measurement according to DIN 53,735.

The polypropylene copolymers used for the production of the plastic-metal laminates according to the invention are available, for example, under the trade name Novolen® 3225 MCX and Novolen® 3520 LX from BASF AG.

Mixtures of the stated polypropylene copolymers, preferably 1:1 mixtures can of course also be co-extruded to give the polypropylene film.

According to the present invention, up to 50% by weight of the polypropylene random copolymer used for the production of the polypropylene film can be replaced with polypropylene homopolymer. In this case, a mixture of random polypropylene copolymer and of polypropylene homopolymer is therefore extruded to give a polypropylene film. If more than 50% by weight of polypropylene homopolymer is used in the plastics mixture, the metal/plastic laminates produced therefrom have a certain tendency to crazing. Suitable propylene homopolymers have a molecular weight distribution $M_w: M_n$ in the range from 2 to 10, a melt flow index MFI 230° C./2.16 kg in the range from 1 to 20 g/10 min (measured according to DIN 53,735) and an isotactic index in the range from 80 to 99%, preferably 90 to 98%.

A mixture of the random polypropylene copolymer described and a polypropylene homopolymer having a molecular weight distribution $M_w:M_n$ in the range from 3 to 6 and a melt flow index MFI 230° C./2.16 kg in the range from 4 to 15 g/10 min (measured according to DIN 53,735) is preferably used. The isotactic index of these polypropylene homopolymers is in the range from 80 to 99%, preferably in the range from 90 to 98%. The homopolymers are known and can be prepared, for example, by the polymerization process described in DEA-3730022.

Propylene homopolymers having a molecular weight distribution $M_w:M_n$ in the range from 3 to 5 and a melt flow index MFI 230° C./2.16 kg in the range from 10 to 12 g/10 min (DIN 53,735) are particularly preferred.

Suitable propylene homopolymers are available, for example, under the trade name Novolen® 1100 N and Novolen® 1125 N (BASF AG).

The thermoplastic polypropylene plastics films described may also contain conventional additives, such as, for example, internal and external lubricants, antiblocking agents, stabilizers, antioxidants, pigments, and crystallization aids. These additives are used in the amounts required for production, processing, compounding and use, in the form of powder, fine powders or beads or directly incorporated in the polymer. Further information on the amounts usually used and examples of suitable additives are given, for example, in the book Gächter-Müller, Kunststoffadditive, Carl-Hanser Verlag.

It is particularly advantageous if the thermoplastic polypropylene films contain up to 0.5 by weight, based on the total weight of the film, of erucamide and/or oleamide as lubricants and up to 0.2% by weight, based on the total weight of the plastics film, of antiblocking agents, preferably silica, and, if required, antioxidants and, if required, further processing stabilizers.

Phenol derivatives are preferably used as antioxidants. Other suitable additives are titanium dioxide, calcium carbonate, kieselguhr, calcium, stearate and primary and secondary fatty amides. For example, UV stabilizers of the hindered amine light stabilizers (HALS) type are used as UV stabilizers.

The adhesion promoter layer arranged between the polypropylene substrate film and the metal may likewise contain the abovementioned additives. However, these are preferably incorporated into the polypropylene substrate film.

In the metal/plastics film laminates according to the invention, the adhesion promoters generate the adhesion between the metal sheet and the plastic film. The adhesion promoter plastic is coextruded together with the plastic for the substrate film, the coextruded film obtained then being laminated with the metal sheet by means of the adhesion promoter layer. Polypropylene plastics modified with carboxyl groups and/or anhydride groups are used as adhesion promoters. The polypropylenes used as adhesion promoters may also have groups which can be hydrolyzed to COOH groups.

Suitable adhesion-promoting polypropylenes can be prepared, for example, by copolymerization of propylene with α,β-ethylenically unsaturated carboxylic acids, α,β the corresponding anhydrides or the corresponding esters or half-esters having 1 to 8 carbon atoms in the alcohol radical. Suitable carboxylic acids or anhydrides thereof are acrylic acid, methacrylic acid, crotonic acid, itaconic acid, aconitic acid, maleic acid, maleic anhydride, citraconic acid and its anhydride, methyl hydrogen maleate and methyl hydrogen fumarate. Acrylic acid and methacrylic acid are preferred.

Suitable copolymerizable esters are esters of α,β-ethylenically unsaturated carboxylic acids having 1 to 8 C atoms in the alcohol radical. n-Butyl acrylate is preferably used.

The acid concentration is usually in the range from 5 to 15%.

The acid-modified polypropylenes and processes for their preparation are described, for example, in EP-A312302.

Polypropylene graft copolymers which can be prepared by grafting ethylenically unsaturated carboxylic acids or anhydrides thereof, such as, for example, maleic anhydride, onto polypropylene in conventional mixers or extruders are likewise suitable for the production of the adhesion promoter layer.

The graft copolymers can thus be prepared by reacting the base materials with peroxides or subjecting them to strong mechanical stresses and thus producing free radicals and bringing them into contact with suitable monomers. According to British Patent 679,562, the free radicals can be produced by high-speed stirrers, shaking, milling, kneading, ultrasonic vibrations or passing filters or capillary tubes at high linear velocities. This results in degradation of the polymer, with formation of reactive free radicals at which a grafting reaction can take place.

In conventional extruders, grafting can be carried out if suitable initiators, such as organic peroxides, are added to the reaction mixture and the reaction is carried out in a special reaction zone described, for example, in U.S. Pat. Nos. 3,862,265, 3,953,655 and 4,001,172.

The free radicals may be produced thermally, by means of high-energy radiation or mechanochemically, for example in a disk extruder.

DE-A-36 39 564 describes a peroxide-free process for the preparation of graft polymers of the polyolefins. This process is preferably used for the preparation of the adhesion promoters used in the laminates according to the invention. This peroxide-free process has in particular the advantage that no undesirable degradation and crosslinking reactions take place. Furthermore, no impairment of the polymers in color and odor occurs in this process, and moreover the adhesive strength of the materials obtained with respect to polar substances, such as metals, decreases in the grafting reaction when peroxides are used.

Suitable ethylenically unsaturated carboxylic acids and/ or derivatives thereof are in particular the conventional compounds, such as maleic acid, fumaric acid, itaconic acid, acrylic acid, acrylic anhydride, methacrylic acid, crotonic acid, maleic anhydride and itaconic anhydride. Preferred compounds are maleic acid, fumaric acid and in particular maleic anhydride.

The monomers to be grafted are used in general in the concentration range of 0.01 to 0.5% by weight, based on the polymer mixture. In general, the monomers to be grafted are mixed with the molten polymer mixture, and the grafting reaction is carried out in the temperature range from about 200° C. to about 300° C. in conventional extruders at a pressure of 1 to about 500 bar.

Polypropylenes grafted with ethylenically unsaturated carboxylic acids or carboxylic anhydrides are described, for example, in EP-A-385 645, U.S. Pat. No. 4,957,820, U.S. Pat. No. 4,980,210, EP-A-312 306 and EP-A-312302.

The base polypropylenes onto which grafting is effected are conventional polypropylene homopolymers, polypropylene random copolymers, polpropylene [sic] block copolymers and polypropylene random block copolymers. Thus, polypropylene random copolymers are to be understood as meaning random copolymers of propylene with 1 to about 10% by weight of comonomers. Suitable comonomers are $C_2$- to $C_{12}$-α-monoolefins, in particular $C_2$- to $C_6$-α-monoolefins.

The so-called polypropylene block copolymers are to be understood as meaning mixtures of polypropylene homopolymer and propylene/comonomer rubber. In general, they have a rubber content of 15 to 40%. They can be prepared by first homopolymerizing propylene and, in a second stage, polymerizing a mixture of propylene and the comonomers with the polypropylene homopolymer. Polypropylene/ethylene block copolymers are described, for example, in EP-A-131 268. Polypropylene random block copolymers are to be understood as meaning copolymers whose matrix material consists of propylene random copolymer. The propylene random block copolymers differ from conventional polypropylene block copolymers which have propylene homopolymer as matrix material through higher flexibility, toughness and better weldability.

The graft polymers which are suitable as adhesion promoters can be used, if required, together with nongrafted polypropylenes. In order to achieve good adhesion between the polypropylene top layer and the metal, it is however necessary for the content of unsaturated carboxylic acid or its derivatives to be at least 0.05%.

Adhesion promoters which contain a polypropylene random block copolymer grafted with 0.1 to 0.5% by weight, preferably 0.2 to 0.4% by weight, based on the total weight of the monomers, of maleic anhydride are particularly preferably used in the laminates according to the invention.

Adhesion promoters which contain a polypropylene random copolymer which is grafted with 0.1 to 0.5% by weight, preferably 0.2 to 0.4% by weight, based on the total weight of the monomers, of maleic anhydride and comprises 1 to 10% by weight, preferably 1 to 7% by weight, based on the total weight of the monomers, of ethylene and/or $C_4$- to $C_{10}$-α-monoolefins are also preferred. But-1-ene, 4-methylpent-1-ene, hex-1-ene, n-oct-1-ene and n-dec-1-ene may be mentioned as examples for suitable $C_4$- to $C_{10}$-α-monoolefins.

The production of the plastics film/adhesion promoter/ metal laminates is a generally known process. A procedure is adopted in which the thermoplastic for the substrate film and the adhesion promoter are first coextruded together. The metal sheet is then covered with the coextruded film in such a way that the adhesion promoter layer of the laminate comes into contact with the metal surface. By the use of pressure and heat, the polypropylene film/adhesion promoter/metal laminate is produced either by means of a heatable press or in the roll nip of a roll mill or calender by means of heatable rolls. The pressure and the temperature are to be chosen so that, on the one hand, the adhesion promoter forms a strong and stable bond with the metal foil or the metal sheet and, on the other hand, the thermoplastic layer does not melt.

The coating of the metal sheet or the thermoplastic laminated film has in general a total dry film thickness of less than 500 μm, preferably 10 to 200 μm and particularly preferably less than 100 μm. The thickness of the adhesion promoter layer is between 0.5 and 100 μm. The thickness of the polypropylene film layer accordingly has values between 10 and 499.5 μm. As already mentioned, it is possible to use thermoplastic laminated films which consist only of an adhesion promoter layer and a top layer, but laminated films comprising a plurality of layers can also be used. In this case, the different thermoplastic layers may consist of the same or different material in the same or different layer thickness.

Finally, the remaining side of the metal sheet, on the outside of the container, may also be coated with a thermoplastic laminated film, preferably one that is planar. Alternatively, the remaining side of the metal sheet can be coated with a liquid or powder coating material.

The polypropylene top layer/adhesion promoter/metal laminates according to the invention are used for the production of packaging containers, in particular for the production of bases or covers of cans, valve disks of aerosol cans and closures. The production of the closure parts is effected by the conventional methods (cf. for example VR-INTERPACK 1969, pages 600–606: W. Panknin, A. Breur and M. Sodeik, "Abstreckziehen als Verfahren zum Herstellen von Dosen aus Weißblech" [Ironing as a method for the production of cans from tinplate], SHEET METAL INDUSTRIES, August 1976: W. Panknin, CH. Schneider and M. Sodeik, "Plastic Deformation of Tinplate in Can Manufacturing"; Verpackungs-Rundschau, Issue April 1971, pages 450–458: M. Sodeik and I. Siewert, "Die nahtlose Dose aus Weißblech" [The seamless tinplate can]; Verpackungs-Rundschau, Issue November 1975, pages 1402–1407: M. Sodeik, K. Haaß and I. Siewert, "Herstellen von Dosen aus Weißblech durch Tiefziehen" [Production of cans from tinplate by deep-drawing], working folder for the practition in the packaging industry, Metalle, Part II, Group 2, Weißblech [tinplate], Ser. No. 220.042 to 220.048 in neue Verpackung December 1987, page B 244 to B 246 and neue Verpackung January 1988, pages B 247 to B 250).

Reference is therefore made to the literature with regard to further details.

The polypropylene film/adhesion promoter/metal laminates according to the invention exhibit virtually no crazing. Furthermore, the adhesions between the metal and adhesion promoter layers and between the polypropylene film and adhesion promoter layers are extremely good. The polypropylene top layers protect the metal very well against attack by the contents, corrosion products of the metal also being prevented from affecting the contents. Contamination of the contents due to dissolved components of the polypropylene top layer is not observed during sterilization and storage of the packed goods.

The invention is illustrated in detail below with reference to illustrative embodiments:

Comparative Example 1

A commercial polypropylene homopolymer (Novolen® 1125 N from BASF AG) is coextruded with the adhesion promoter Novatec® 196 P (Mitsubishi Chemical Ind.), both materials being in the form of granules. The main extruder is a 90 mm ø 25 D extruder from Barmag and the coextruder is 45 mm ø 25 D extruder from Schwabethan. The ring die of the main extruder is smooth while that of the coextruder is grooved. The melt temperature of the polypropylene homopolymer Novolen is 246° C. and that of the adhesion promoter is 285° C. The melt pressure of the plastic Novolen is 75 bar while that of the adhesion promoter is 95 bar.

The zone temperatures of the main extruder are 195° C. to 220° C. and those of the coextruder are 120° to 250° C. The chill roll has a temperature of 15° C. The layer thickness of the polypropylene substrate film is 40 µm and that of the adhesion promoter film is 10 µm. An air knife coater is operated at 60 mbar. The film laminate laminated with the metal exhibits crazing after punching.

EXAMPLE 1

A polypropylene random copolymer of the brand Novolen® 3225 MCX from BASF AG is coextruded together with the adhesion promoter Novatec® 196 P (Mitsubishi Chemical Ind.). The extruder for the Novolen (main extruder) is a 90 mm ø 25 D from Barmag and that for the adhesion promoter (coextruder) is a 45 mm ø 25 D from Schwabethan. The melt temperature of the Novolen plastic is 260° C. and that of the adhesion promoter is 285° C. The melt pressure of the Novolen plastic is 55–58 bar and that of the adhesion promoter is 95 bar.

The zone temperatures of the main extruder are 205 to 235° C. and those of the coextruder are 120 to 250° C. The temperature of the chill roll is 30° C. The layer thicknesses of the polypropylene top layer and of the adhesion promoter are 40 µm and 10 µm. An air knife coater is operated at 95 mbar. The film laminate laminated with metal exhibits no crazing after punching. The adhesion of the plastic film to the metal sheet is more than 75 N/15 mm.

EXAMPLE 2

Example 1 is repeated, except that the polypropylene Novolen® 3520 LX (BASF AG) is used instead of the Novolen® 3225 MCX (BASF AG). The film laminate laminated with metal exhibits no crazing at all after punching. The adhesion of metal and plastics film is more than 75 N/15 mm.

EXAMPLE 3

Example 1 is repeated, except that a 1:1 mixture of Novolen® 3520 LX and a polypropylene homopolymer (Novolen® 1125 N BASF AG) is used instead of the Novolen® 3225 MCX (BASF AG). The layer thickness of the substrate film is likewise 40 µm. The film laminate laminated with metal exhibits no crazing after punching.

The adhesion between the plastics film and the metal sheet is more than 75 N/15 mm.

We claim:

1. A polypropylene film/adhesion promoter/metal laminate, comprising:

a metal layer;

an adhesion promoter selected from the group consisting of polypropylene modified with carboxyl groups, polypropylene modified with anhydride groups, and mixtures thereof; and a polypropylene film comprising polypropylene random copolymers of 90 to 99% by weight propylene and 1 to 10% by weight comonomers selected from the group consisting of $C_2$ and $C_4$ to $C_{12}$ monoolefins and mixtures thereof, wherein the polypropylene random copolymers have a molecular weight distribution $M_W:M_n$ in the range from 2 to 10 and a melt flow index MFI 230° C./2.16 kg in the range from 1 to 20 g/10 min.

2. A polypropylene film/adhesion promoter/metal laminate according to claim 1, wherein the polypropylene film comprises polypropylene random copolymers of 1 to 4% by weight of ethylene and 99 to 96% by weight of propylene, based on the total weight of the monomers, having a molecular weight distribution $M_W:M_n$ in the range from 3 to 6 and a melt flow index MFI 230° C./2.16 kg, in the range from 5 to 9 g/10 min.

3. A polypropylene film/adhesion promoter/metal laminate according to claim 1, wherein the polypropylene film comprises polypropylene random copolymers of 90 to 97% by weight of propylene, 2 to 5% by weight of ethylene and 1 to 6% by weight of but-1-ene, based in each case on the total weight of the monomers, having a molecular weight distribution $M_W:M_n$ in the range from 3 to 6 and a melt flow index MFI 230° C./2.16 kg in the range from 4 to 8 g/10 min.

4. A polypropylene film/adhesion promoter/metal laminate according to claim 1, wherein the polypropylene film comprises a blend of the polypropylene random copolymer and up to 50% by weight of the polypropylene homopolymer based on the total weight of the polypropylene random copolymer and the polypropylene homopolymer in the film layer.

5. A polypropylene film/adhesion promoter/metal laminate according to claim 4, wherein the polypropylene homopolymer used has a molecular weight distribution $M_W:M_n$ in the range from 3 to 6 and a melt flow index MFI 230° C./2.16 kg in the range from 4 to 15 g/10 min.

6. A polypropylene film/adhesion promoter/metal laminate according to claim 1, wherein the polypropylene film contains up to 0.5% by weight, based on the total weight of the polypropylene film, of compounds selected from the group consisting of erucamide, oleamide, and mixtures thereof, and up to 0.2% by weight, based on the total weight of the polypropylene film, of antiblocking agents.

7. A polypropylene film/adhesion promoter/metal laminate according to claim 1, wherein the adhesion promoter is a polypropylene random block copolymer grafted with 0.1 to 0.5% by weight, based on the total weight of the monomers, of maleic anhydride.

8. A polypropylene film/adhesion promoter/metal laminate according to claim 1, wherein the adhesion promoter is a polypropylene random copolymer grafted with 0.1 to 0.5% by weight maleic anhydride, and comprises 1 to 10% by weight comonomers selected from the group consisting of ethylene and $C_4$ to $C_{10}$ monoolefins and mixtures thereof, based on the total weight of the monomers.

9. Packaging containers comprising the polypropylene film/adhesion promoter/metal laminates according to claim 1.

10. A polypropylene film/adhesion promoter/metal laminate according to claim 1, wherein the adhesion promoter is a polypropylene random copolymer grafted with 0.2 to 0.4% by weight maleic anhydride, and comprises 1 to 10% by weight comonomers selected from the group consisting of ethylene and $C_4$ to $C_{10}$ monoolefins and mixtures thereof, based on the total weight of the monomers.

11. A polypropylene film/adhesion promoter/metal laminate according to claim 1, including $SiO_2$ as the antiblocking agent.

12. A polypropylene film/adhesion promoter/metal laminate according to claim 1, further comprising antioxidants and processing stabilizers.

13. A polypropylene film/adhesion promoter/metal laminate according to claim 1, wherein the polypropylene random copolymers are 93 to 99% by weight propylene and 1 to 7% by weight comonomers, and wherein the polypropylene random copolymers have a molecular weight distribution $M_W:M_n$ in the range from 3 to 6 and a melt flow index MFI 230° C./2.16 kg in the range from 4 to 15 g/10 min.

14. A method for preventing crazing of a polypropylene film/adhesion promoter/metal laminate during formation of a packaging container, comprising the steps of:

(a) forming a two-layer film by coextruding a polypropylene film and an adhesion promoter;

(b) covering a metal sheet with the coextruded film in such a way that the adhesion promoter layer comes into contact with the metal surface;

(c) laminating the metal sheet with the coextruded film to produce a polypropylene film/adhesion promoter/metal laminate; and (d) forming the laminate into a packaging container having the polypropylene film as the inner coating surface;

wherein the adhesion promoter is selected from the group consisting of polypropylene modified with carboxyl groups, polypropylene modified with anhydride groups, and mixtures thereof; and further wherein the polypropylene film includes polypropylene random copolymers of 90 to 99% by weight propylene and 1 to 10% by weight comonomers selected from the group consisting of $C_2$ and $C_4$ to $C_{12}$ monoolefins and mixtures thereof; and still further wherein the polypropylene random copolymers have a molecular weight distribution $M_w:M_n$ in the range from 2 to 10 and a melt flow index MFI 230° C./2.16 kg in the range from 1 to 20 g/10 min.

* * * * *